Jan. 31, 1928.

B. MARKOW

BIRD CAGE LATCH

Filed Jan. 15, 1927

1,657,578

INVENTOR
Bernard Markow
BY
Harry Jacobson
ATTORNEY

Patented Jan. 31, 1928.

1,657,578

UNITED STATES PATENT OFFICE.

BERNARD MARKOW, OF BROOKLYN, NEW YORK, ASSIGNOR TO ART CAGE MANUFACTURING COMPANY, INC., OF NEW YORK, N. Y., A CORPORATION OF NEW YORK.

BIRD-CAGE LATCH.

Application filed January 15, 1927. Serial No. 161,293.

This invention relates to latches for bird cages and is particularly applicable to that type of bird cage in which the bottom may be entirely removed for the purposes of cleaning, or for the replacement of food, water and the like. In such cages it is customary to make the bottom portion of the cage a distinct and separate unit and to connect the bottom with the cage body by suitable detachable securing means. This invention contemplates the provision of spring means for effectively securing the cage bottom and the cage body together, which means may be readily sprung into inoperative position, into engagement with the cage bars, which cannot be involuntarily or accidentally detached, and which when in operative position is thoroughly efficient for holding the parts together against relative displacement in any direction.

The various objects of my invention will be clear from my description which follows and from the drawings, in which, Fig. 1 is a perspective view of a portion of a cage and bottom therefor showing the locking means or latch in operative position.

Figure 1:
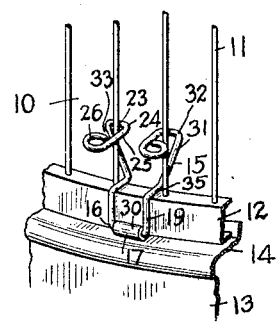

In that embodiment of my invention illustrated, the cage body is designated by the numeral 10 and the upright bars thereof as 11. A rim as 12 of any suitable shape forms the lower edge of the cage 10 and serves as the means for securing the lower ends of the bars 11 in proper spaced relation as is customary. The cage bottom 13 is provided in the usual manner with a horizontal, annular portion 14 on which the rim 12 is adapted to rest. To secure the cage 10 to the bottom 13 I provide a spring latch 15 of peculiar shape soon to be described, and preferably formed of a single piece of spring wire and so shaped as to clamp the rim 12 down on the portion 14 and to hook into and engage the bars 11.

The latch 15 is made approximately U-shaped in general outline and is designed to be rotated about the lower end thereof. Said latch includes a pair of upstanding arms suitably bent intermediate of the ends thereof to engage the rim 12 and to hold said rim and the cage body secured thereto in proper position. The upper ends of the spring latch are normally spaced apart by the spring action thereof so that they may be drawn together against the spring action of the remainder of said latch when it is desired to pass said ends to the inside of the cage through the space between the cage bars 11.

Figure 3:
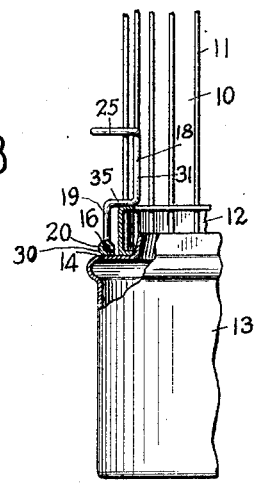
Fig. 3 is a vertical side elevation partly in section of a part of a bird cage to which my invention has been applied showing the latch or locking means in operative position and Fig. 4 is a similar view showing particularly a modified form of the bearing for the spring latch and showing further the cage body separated from the bottom.
Figure 2:
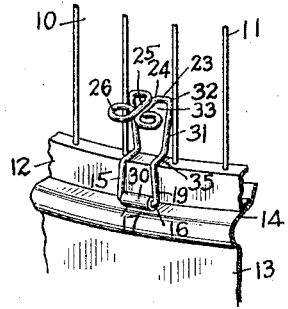
Fig. 2 is a similar view showing the latch members sprung together preparatory to the removal thereof from the cage body into inoperative position.
Figure 4:
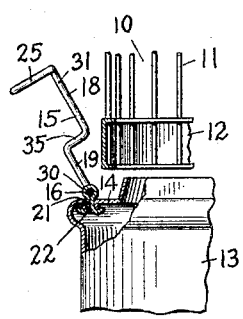

In detail, the lowermost horizontal portion 16 of the latch is supported in a suitable bearing 17 which is in turn properly secured to the rim 14 of the cage bottom 13. As illustrated in Fig. 3, the bearing may consist of a piece of sheet metal 20 bent into cylindrical form to enclose the portion 16 of the latch and soldered to the rim 14. As illustrated in Fig. 4, the bearing 17 may be secured to the rim 14 by first making a suitable slit in said rim vertically below and substantially parallel to the axis of the cylindrical portion 30 of the bearing, after which the sides of said slit may be depressed to form the depending flanges 21. The bearing 17 may then be made of sufficient depth to provide enough material as 22 to pass through the slot between the flanges 21 and to extend below the lowermost edges of said flanges. The extremities of the material 22 may then be clinched over the lower edges of the flanges 21 whereby movement of said bearing in any direction is prevented and said bearing is firmly secured in place, without soldering if desired. It will be understood that the bearing 17 may be secured to the rim in any other suitable manner as may be desired or found advisable.

Upstanding at substantially right angles to the horizontal portion 16 of the latch 15, are the spring arms 18 which form the legs of the U and which are normally spaced apart at their upper ends a distance greater than that between the cage bars 11. Said arms however may be sprung together whereby the innermost parts thereof may be moved through the space between said bars 11 from the inside to the outside of the cage. The lower upright portions 19 of said arms 18 are adapted to remain at all times outside of rim 12, and are of such height as to reach the upper surface of the cage rim 12, said lower portions 19 being preferably spaced at their upper ends a distance less than that between the cage bars 11. Extending inwardly from the upper extremities of the portions 19 and arranged substantially parallel to each other, are the rim engaging portions 35. The bar engaging sections 31 extend upwardly and divergently from the respective inner ends of the rim engaging portions 35 so that at the bends 32 thereof said sections are normally spaced apart a distance substantially greater than that between the cage bars 11. Extending preferably horizontally toward each other from the bends 32 are the horizontal sections 23, one of which sections is arranged vertically above the other a sufficient distance to allow it to pass above the other when the sections 31 are forced toward each other, said sections 31 and 23 all preferably lying in the same plane and forming the innermost parts of the latch. At the bends 24 formed at the adjacent ends of the sections 23, are arranged the outwardly projecting finger pieces 25 of sufficient length to allow the ends of said pieces to be readily gripped by one desiring to operate the latch. Finally at the outer end of the finger pieces are the loops 26, spaced outwardly from the sections 23 a sufficient distance to allow the bars 14 to enter the spaces 33 therebetween in the operative position of the latch. (Fig. 1.)

When it is desired to secure the cage body 10 to the cage bottom 13, the rim 12 of the cage is arranged on the rim 14 of the bottom with the latch 15 outside of the cage, substantially in the position shown in Fig. 4. The latch is then rotated upwardly about the lower portions 16 thereof in the bearing 17, the loops 26 being simultaneously sprung or squeezed together so that the sections 31, 23 and part of the pieces 25 may pass inside of the bars 11. After said sections have been forced into the inside of the cage between a pair of adjacent bars, the loops 26 are released, whereby the spring action of the arms 18 allows said arms to move away from each other, so that the bars 11 become positioned in the spaces 33 between said loops and the inner sections 23. In this position, the rim engaging sections 35 are clamped firmly down on the upper surface of the rim 12, forcing said rim firmly down on the rim 14 of the cage bottom. It will be seen that the sections 35 cannot be removed from the rim 12 without bringing the latch members 31 and 23 from the inside to the outside of the cage by a reversal of the locking process above described, so that the parts are securely locked together against displacement other than that which may be performed at the will of the cage user.

It will further be seen that various modifications may be made in the shapes and proportions of the various parts of my improved spring latch, falling within the scope of this invention and the range of equivalents accorded by the appended claims. I do not wish to be understood therefore as limiting myself to the specific structure shown and described but intend to avail myself of equivalent modifications which are contemplated.

I claim:

1. In a bird cage, a spring latch secured to the outside of said cage, a cage rim engaging section on said latch integral with the remainder of said latch and extending inwardly of said cage and a bar engaging section on said latch integral with and arranged above the rim engaging section.

2. In a bird cage, a latch of spring wire, a bearing supporting the lower end of said latch for rotation in a vertical plane and spaced portions on said latch offset inwardly of said lower end and relatively movable toward and from each other for passage into the inside of said cage, said portions assuming a position partly inside and partly outside of said cage when released.

3. In a bird cage, a spring latch, means for rotatably supporting one end of said latch, and spring portions on the other end, said latch adapted to be brought together for rotation about the supported end thereof into the inside of said cage and to be released to assume substantially the normal position thereof whereby further rotation of said latch is prevented by the engagement of said portions with said cage.

4. In a bird cage having a series of spaced upright bars therein and a removable base, means for detachably connecting said base to said bars comprising a substantially U-shaped spring latch normally open at the upper end, a bearing on said base, a bearing engaging member at the lower end of said latch supported by said bearing, inwardly extending rim engaging portions on said latch, and spring arms forming the innermost parts of said latch, extending upwardly from said rim engaging portions and adapted to be sprung together for passage between adjacent bars of said cage to the inside of said cage and to engage said bars when released.

5. In a bird cage, a spring latch of a single piece of spring wire, means at one end of said latch for rotatably supporting said latch, and a pair of outwardly extending projections integral with said latch for preventing further movement of said latch after said latch has been rotated into operative position by the engagement thereof with said cage.

6. In a bird cage, a series of spaced upright bars, a base, a rim for the lower ends of said bars, and a spring latch secured to said base, adapted to clamp said rim to said base and to engage said bars whereby involuntary displacement of said latch is prevented.

7. In a bird case, a series of spaced upright bars, a rim for the lower ends of said bars, a spring latch of a single piece of wire, free ends on said latch normally spaced apart a distance greater than that between adjacent bars, outwardly extending members at said ends whereby said latch may be manipulated and said ends brought together for the passage of the innermost extremities thereof between a pair of adjacent bars and inside of said cage.

8. In a bird cage, spaced bars, a rim securing said bars in spaced relation, a substantially U-shaped latch of a single piece of spring wire, a bearing for the lowermost part of said latch, upright portions on the lowermost part of the arms of said latch arranged outside of said rim, inwardly extending portions adapted to engage the upper face of said rim and to pass between a pair of bars to the inside of said cage, inclined arms extending upwardly and divergently from the inner extremities of said rim engaging portions and forming the innermost parts of said latch, and finger pieces extending outwardly from the upper ends of said arms, one of said pieces being adapted to pass under the other when the arms are squeezed together, whereby said arms may be passed between a pair of adjacent bars and into the inside of the cage.

9. In a bird cage, a base, a latch substantially U-shaped, of a single piece of wire, and adapted to have part thereof passed inside of said cage, a rim securing portion on said latch, arms constituting a bar engaging portion on said latch, and members on said latch secured to said base whereby the arms of said latch may be moved relatively in a horizontal direction.

10. In a bird cage, a series of vertical spaced bars, a rim on said cage, maintaining the lower ends of said bars in place, a cage bottom, and a rotatable wire spring latch for detachably securing said rim to said bottom comprising a bearing portion rotatably mounted on said bottom, rim engaging portions, bar engaging portions adapted to be sprung together and passed into the inside of said cage between a pair of adjacent bars, and loops at the upper end of said latch spaced outwardly from said bar engaging portions and adapted in the operative position of said latch to be arranged on the outside of said pair of adjacent bars whereby movement of said latch from the operative position is prevented unless said loops are first squeezed together.

11. In a bird cage, a series of spaced vertical bars, a rim maintaining the lower ends of said bars in place, a removable cage bottom adapted to support said rim and means for detachably securing said rim to said bottom comprising a spring latch mounted on said bottom, means on said latch for frictionally engaging said rim and means on said latch adapted to engage a pair of adjacent bars in the operative position of said latch and adopted to be moved relatively to occupy a space less than the distance between adjacent bars whereby said bar engaging means may be passed between said bars into and out of said cage.

12. In a bird cage, a cage body, including a plurality of upright bars, a cage bottom, and means for securing said body and bottom together comprising a rotatable spring latch secured to said bottom, having spaced ends at the upper extremity thereof, adapted to be sprung together and inserted between, and to pass to the inside of, an adjacent pair of the cage bars.

BERNARD MARKOW.